March 30, 1948.  C. W. WALZ ET AL  2,438,627
BEET HARVESTER
Filed May 3, 1943  7 Sheets-Sheet 1

INVENTORS
CLAUDE W. WALZ, CLARENCE T.
RASMUSSEN & ROBERT D. GRIFF
BY
ATTORNEYS.

March 30, 1948.  C. W. WALZ ET AL  2,438,627
BEET HARVESTER
Filed May 3, 1943  7 Sheets-Sheet 2

INVENTORS:
CLAUDE W. WALZ, CLARENCE T.
RASMUSSEN & ROBERT D. GRIFF
BY
ATTORNEYS.

March 30, 1948.     C. W. WALZ ET AL     2,438,627
BEET HARVESTER
Filed May 3, 1943     7 Sheets-Sheet 3
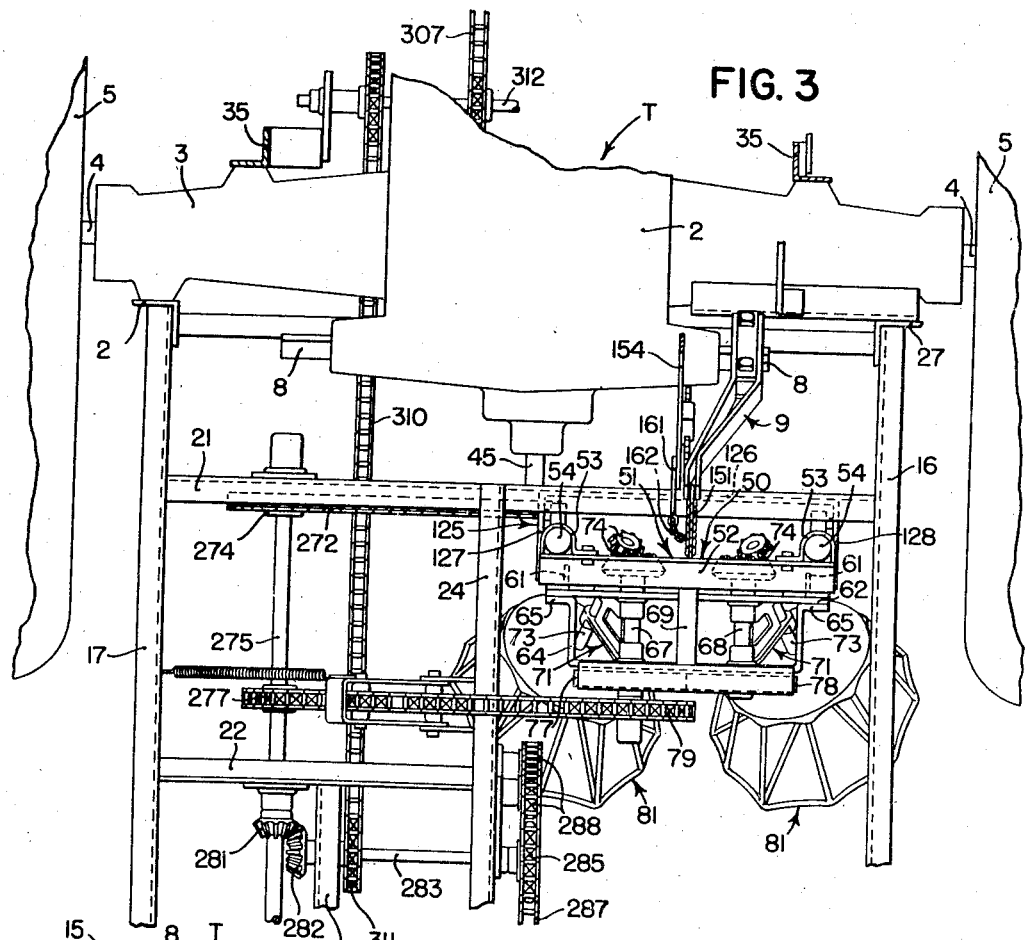
FIG. 3
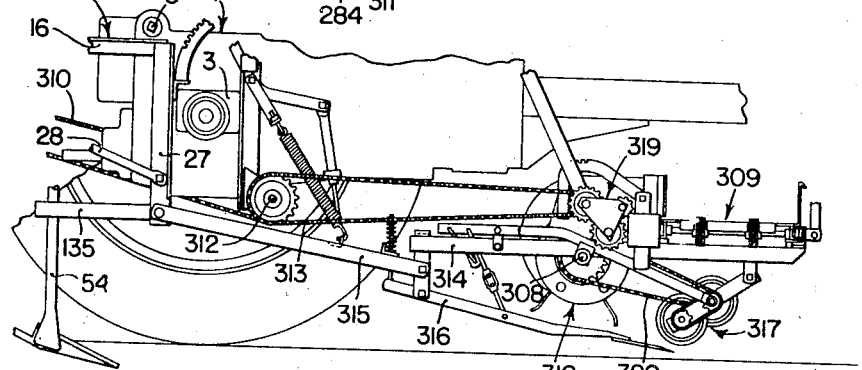
FIG. 2-A
INVENTORS
CLAUDE W. WALZ, CLARENCE T.
RASMUSSEN & ROBERT D. GRIFF
BY
ATTORNEYS.

March 30, 1948.  C. W. WALZ ET AL  2,438,627
BEET HARVESTER
Filed May 3, 1943  7 Sheets-Sheet 4

INVENTORS
CLAUDE W. WALZ, CLARENCE
T. RASMUSSEN, ROBERT D. GRIFF
ATTORNEYS.

March 30, 1948.  C. W. WALZ ET AL  2,438,627
BEET HARVESTER
Filed May 3, 1943  7 Sheets-Sheet 5

INVENTORS
CLAUDE W. WALZ, CLARENCE T.
RASMUSSEN & ROBERT D. GRIFF
BY
ATTORNEYS.

March 30, 1948.                C. W. WALZ ET AL                    2,438,627
                                 BEET HARVESTER
                    Filed May 3, 1943                7 Sheets-Sheet 6
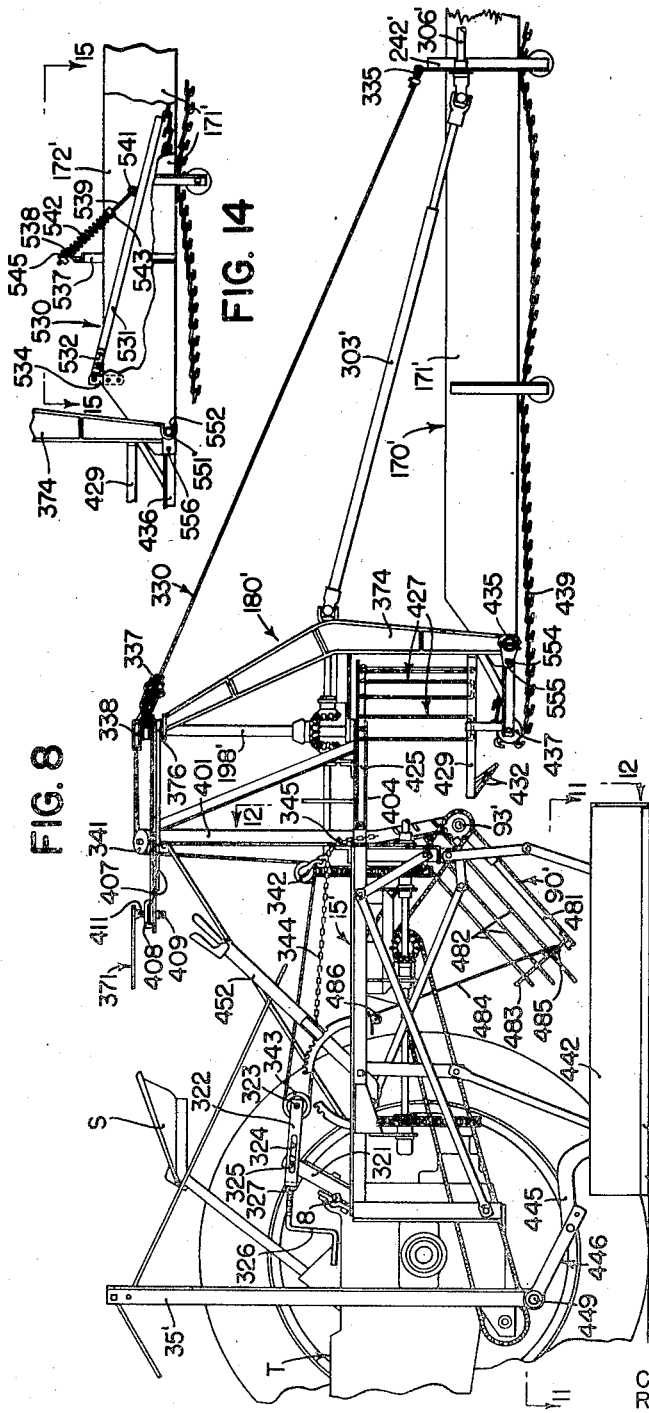
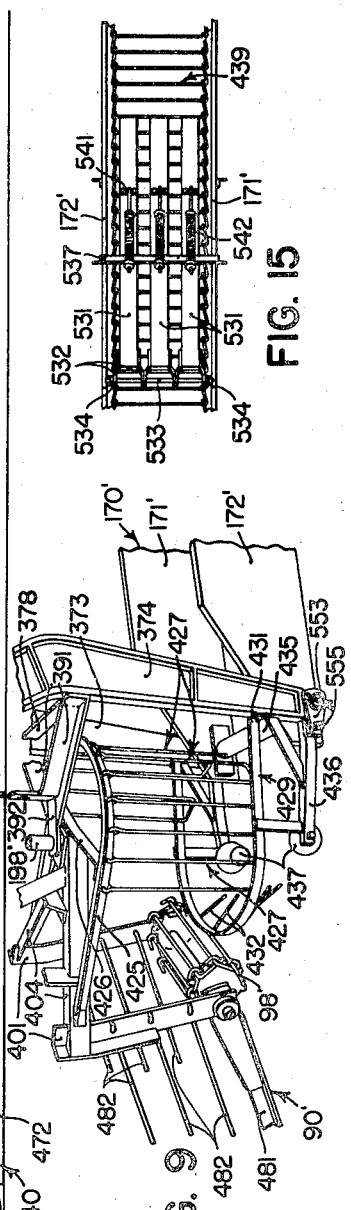
INVENTORS
CLAUDE W. WALZ, CLARENCE T.
RASMUSSEN & ROBERT D. GRIFF
BY
      ATTORNEYS.

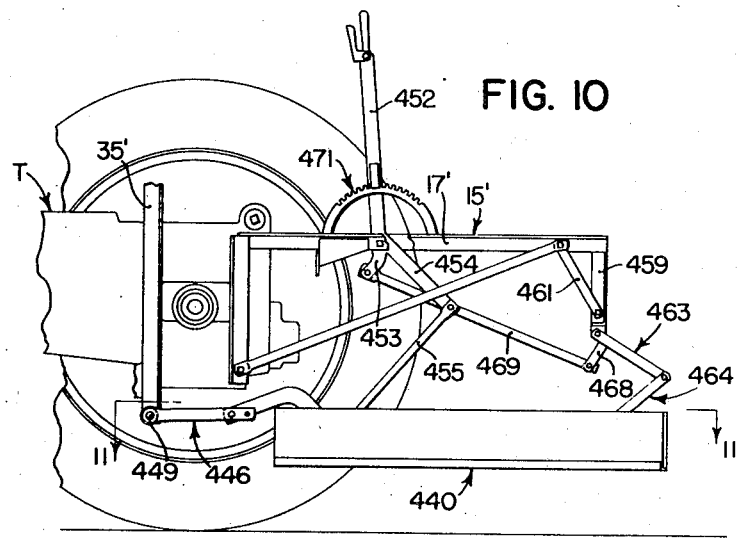
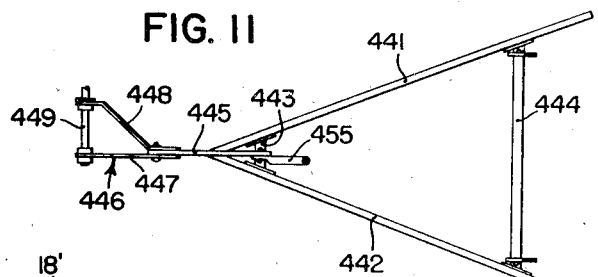
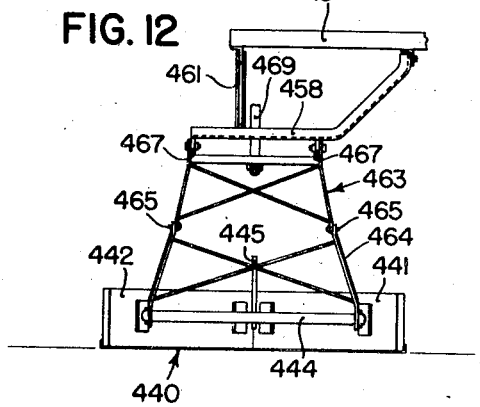
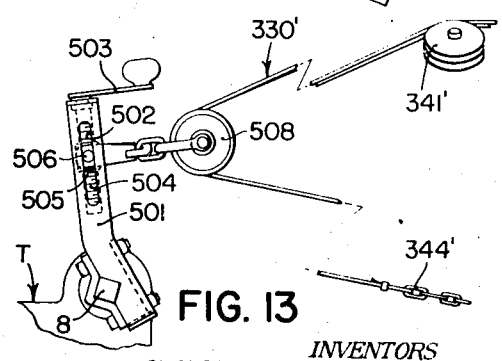

Patented Mar. 30, 1948

2,438,627

UNITED STATES PATENT OFFICE 2,438,627

BEET HARVESTER

Claude W. Walz, Avondale, Colo., and Clarence T. Rasmussen, Moline, and Robert D. Griff, Rock Island, Ill., assignors to Deere & Company, Moline, Ill., a corporation of Illinois Application May 3, 1943, Serial No. 485,526

50 Claims. (Cl. 55—9)

The present invention relates generally to agricultural machines and more particularly to harvesters of a type adapted to harvest root crops and the like.

The object and general nature of the present invention is the provision of a new and useful beet harvester for harvesting sugar beets. More particularly, it is a feature of this invention to provide a tractor mounted beet harvester with means actuated by the power lift of a tractor for raising and lowering the beet lifting unit. Another feature of this invention is the provision of a new and improved beet lifting unit including rotatable beet engaging means disposed above and rearwardly of a pair of beet lifting plows in which the beet engaging means is made to accommodate different sizes of beets.

Another feature of the present invention is the provision of a transfer elevator between the beet lifting unit and the main elevator, with new and improved connections for lifting the front end of the transfer elevator by the power lift, the connections being so arranged that the elevator is not raised until after the lifting unit has been raised through a part of its range of movement.

Another feature of the present invention is the provision of a main beet handling elevator in which means is provided for swinging the elevator laterally so as to deposit in one windrow the beets from any one of several rows, and it is a further feature of this invention to provide means whereby limited lateral swinging movement of the elevator is accommodated. Another feature of this invention is the provision of new and improved driving means for driving the main beet elevator. Still further, another feature of the present invention is the provision of improved driving connections for driving the various parts of the beet harvester from the power take-off shaft of the tractor.

Another feature of this invention is the provision of means for raising the rear end of the beet conveyor from the power lift of the tractor. Still further, another feature of this invention is the provision of manually operated means, accessible to the operator on the tractor, for swinging the beet elevator from one side toward the other. In this connection it is also a feature of this invention to connect the supporting cables of the beet conveyor at such a point that the torque of the drive shaft for the conveyor is at least partially compensated.

Still further, it is a feature of this invention to provide a drag adjustably carried by the frame of the beet harvester and adapted to be raised and lowered from the tractor, the drag being designed to provide a smooth clear surface on which the beets from several rows may be deposited. Another feature of this invention is the provision of improved hopper means receiving the beets from the transfer elevator and accommodating the disposition of the beet conveyor in any one of several positions laterally of the tractor.

These and other objects and advantages of the present invention will be apparent to those skilled in the art after a consideration of the following detailed description, taken in conjunction with the accompanying drawings in which the preferred forms of the present invention have been illustrated.

Referring to the drawings:

Figure 2A is a continuation of Figure 2, showing the beet topping unit;

Figure 3 is an enlarged fragmentary plan view showing details of the driving mechanism;

Figures 6, 7 and 8 show a modified form of beet elevator which is adapted to be raised and lowered from the tractor power lift;

Figure 9 is a perspective view of the hopper construction shown in Figure 8;

Figure 10 is a side view of the drag in raised position;

Figures 11 and 12 are views taken, respectively, along the lines 11—11 of Figure 10 and 12—12 of Figure 8;

Figure 13 is a fragmentary view showing a modified form of power lift actuated cable means for raising the beet elevator; and Figures 14 and 15 are side and plan views, respectively, of means for cleaning the beets as they are moved along by the rear conveyor.

Figure 1:
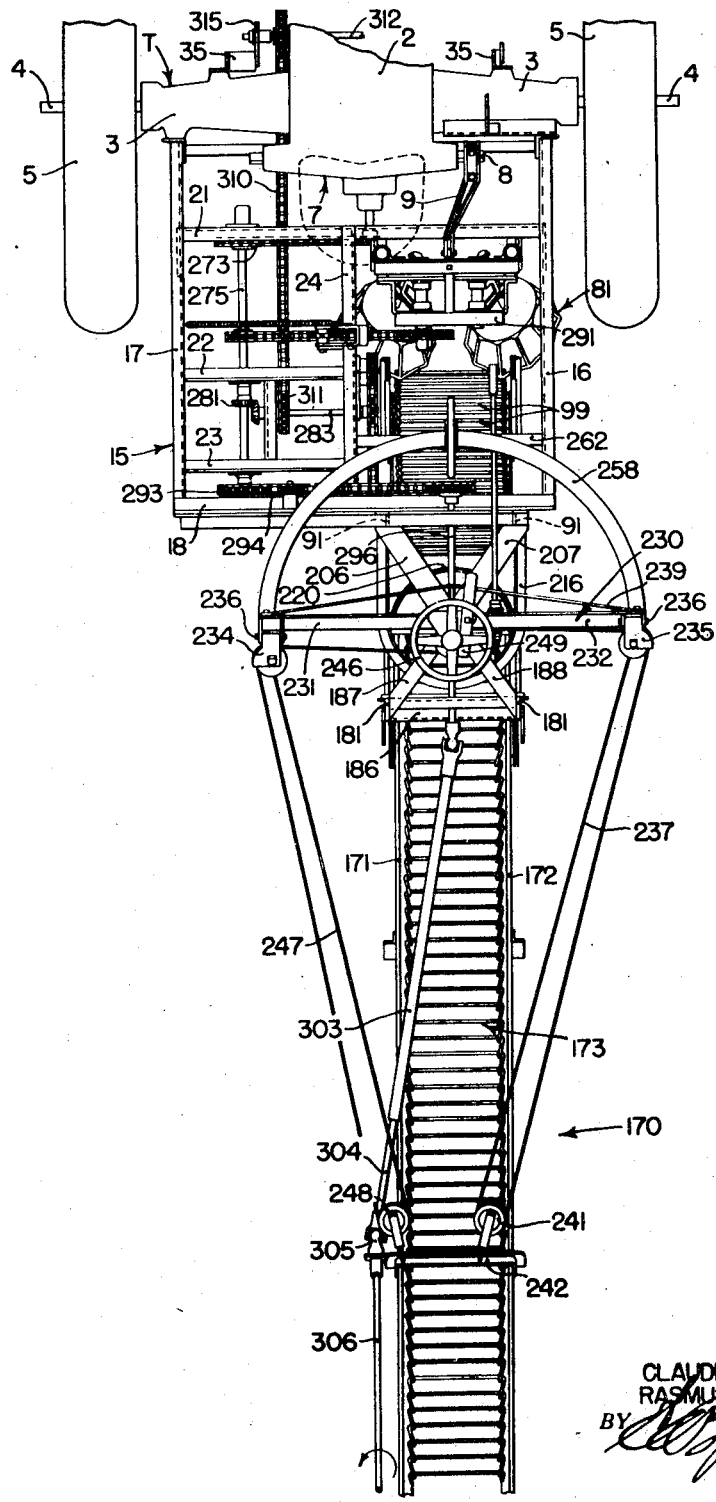
Figure 1 is a plan view of the rear portion of a beet harvester in which the principles of the present invention have been incorporated.
Figure 2:
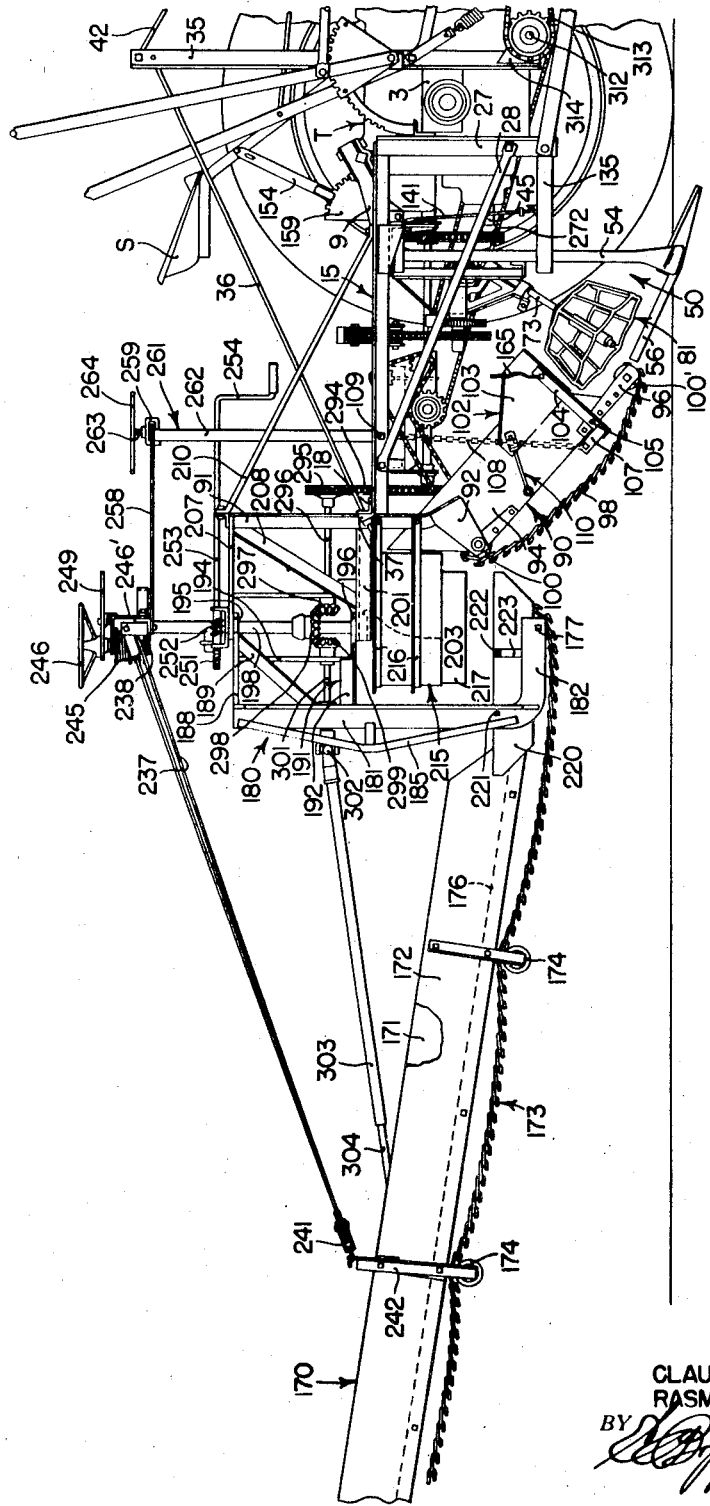
Figure 2 is a side view of the beet harvester shown in Figure 1, showing the beet lifting unit.

Referring first to Figures 1 and 2, the tractor is indicated in its entirety by the reference character T and includes a combination frame and transmission case 2 from the rear portion of which rear axle sleeves 3 extend, receiving a pair of axle shafts 4 on which rear traction wheels 5 are fixed. The tractor T is equipped with a power lift unit, indicated in its entirety by the reference numeral 7, which comprises a rockshaft 8 on which a power lift arm 9 is fixed by any suitable means, such as clamping bolts 11 (Figure 4) and a clamping member 12.

Figure 4:
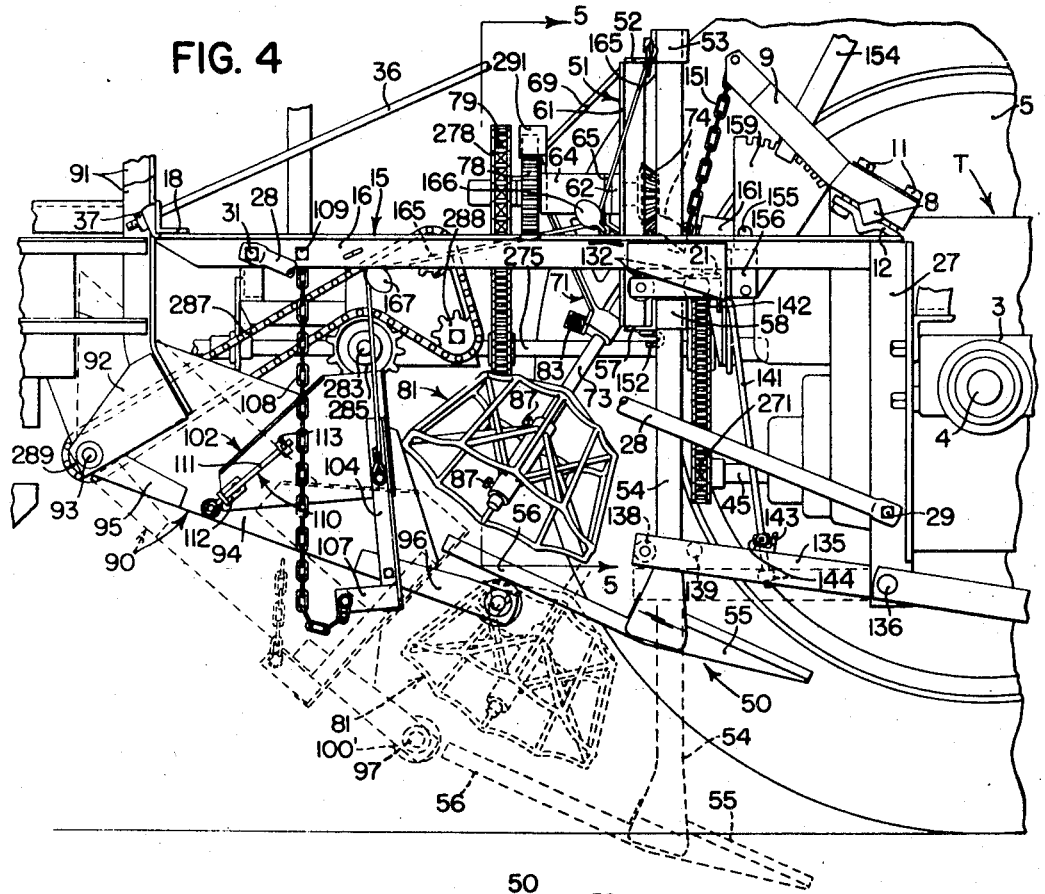
Figure 4 is an enlarged fragmentary side view of the structure shown in Figure 3, including two positions of the transfer elevator and the beet lifting unit.

The rear portion of the transmission case 2 and the sleeves 3 together form a rear axle to which the parts of the beet harvester with which the present invention is particularly concerned are connected. The beet harvester comprises a supporting frame 15 which is generally rectangular in plan and which embodies right and left hand longitudinal bars 16 and 17 and a rear angle bar 18, together with suitable cross braces 21, 22 and 23, a longitudinal frame member 24 and other parts mentioned below. As best shown in Figure 4, the frame 15 includes at its forward end generally downwardly extending bars 27, the upper ends of which are fixed to the forward ends of the frame bars 16 and 17 and the lower ends of which are connected with the rear ends of the bars 16 and 17 by suitable braces 28, the latter being bolted at 29 to the lower ends of the forward vertical frame bars 27 and at 31 to the rear ends of the longitudinal frame bars 16 and 17.

The frame structure 15 just described preferably is secured to the rear sides of the rear axle extensions 3 by attaching studs 33 (Figure 5) at each side of the tractor. At the right side of the tractor, a vertical angle member 35 is secured at its lower end to the forward side of the right hand rear axle extension 3, as best shown in Figure 2, and at its upper end receives the forward end of the downwardly and rearwardly extending brace rod 36, the rear end of which is connected at 37 to the right end of the cross bar 18. Similar bracing is provided at the left side of the tractor. Also, another bracing link 42 is connected at its rear end to the upper end of each of the vertical angles 35 and extends downwardly and forwardly and is connected at their forward ends to the tractor, preferably near the front end thereof. The tractor T is provided with a power take-off shaft 45 of conventional construction, and power is derived from the power take-off shaft 45 for driving the various parts of the beet harvester, as will be explained below.

Figure 5:
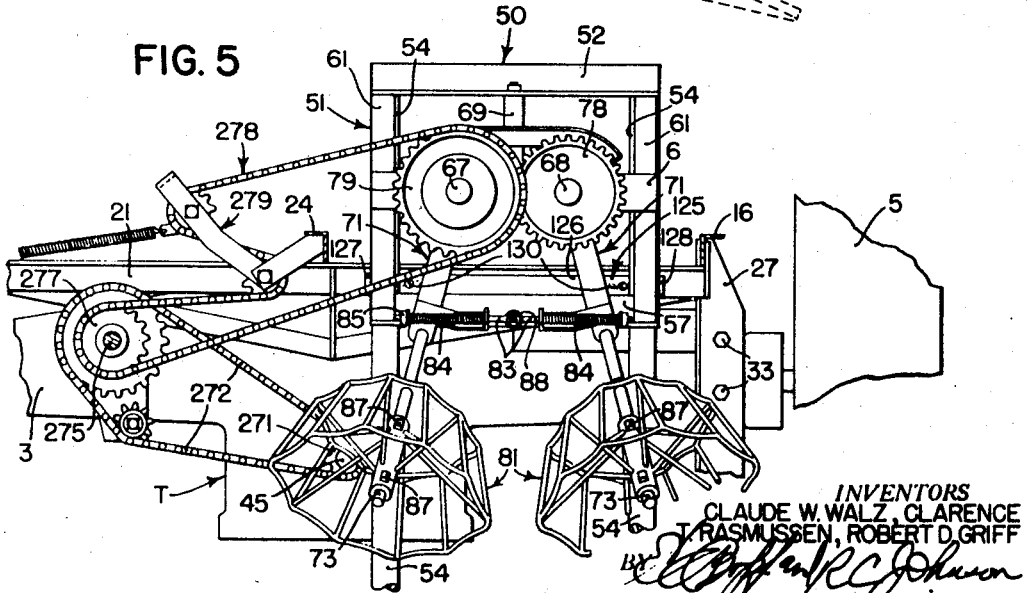
Figure 5 is a view taken generally along the line 5—5 of Figure 4.

The frame 15 adjacent its forward and downwardly extending portion carries a beet lifting unit, indicated in its entirety by the reference numeral 50, and this unit is mounted for generally vertical movement in the frame 15. Referring more particularly to Figures 3, 4 and 5, the beet lifting unit 50 includes a lifting frame 51 which includes an upper angle member 52 carrying clamping means 53 which respectively receive and secure to the angle 52 the upper ends of a pair of vertically extending laterally spaced standards 54 to the lower ends of which lifting plows 55 are secured, each having a rearwardly and upwardly extending beet guiding rod or extension 56 (Figure 4). The lifting frame 51, in addition to the upper cross angle 52, includes a lower cross angle 57 which at its ends is rigidly secured to the standards 54 by clips 58, the clips 58 being similar to the clips or clamps 53. The frame 51 also includes a pair of vertical angles 61 which at their upper ends are secured to the horizontal flange of the upper cross angle 52 and at their lower ends are secured to the lower horizontal flange of the lower cross angle 57, as best shown in Figure 4. Referring now to Figure 3, a cross brace 62 is disposed substantially midway of the ends of the vertical angles 61 and has its ends bolted or otherwise secured to the rear faces of the angles 61. A generally U-shaped member 64 has its ends 65 secured against the ends of the cross brace 62, the intermediate portion of the member 64 being spaced from the brace 62. The two members 62 and 64 form supports for a pair of shafts 67 and 68, the latter being mounted on the members 62 and 64 by suitable bearing means. A brace 69 (Figure 4) is secured at its upper forward end to the angle 52 and at its lower rearward end to the intermediate portion of the U-shaped bar 64.

Mounted on the two shafts 67 and 68, between the members 62 and 64, is a pair of laterally swingable journal-supporting bracket castings 71, the members 71 being swingable generally about the axes of the shafts 67 and 68, respectively. In the lower swinging end of each of the members 71 is a kicker wheel shaft 73, and each kicker wheel shaft 73 is connected to be driven from the associated drive shaft, 67 or 68, by a pair of bevel gears 74. The rear ends of the two kicker wheel drive shafts 67 and 68 respectively receive intermeshing gears 77 and 78 (Figures 3 and 5), and a driving sprocket member 79 is mounted on the rear extended end of the laterally inner kicker wheel drive shaft 67. The means by which the sprocket 79 is driven from the power take-off shaft 45 of the tractor will be described below. A beet engaging and handling member in the form of a kicker wheel 81 is secured to the lower end of each of the kicker wheel shafts 73, the latter extending generally downwardly and laterally outwardly and rearwardly, as best shown in Figures 3-5. The particular form of the beet engaging and handling members 81 is substantially the same as shown in the co-pending application, Serial No. 371,152, filed December 21, 1940, by Claude W. Walz, now United States Letters Patent No. 2,337,699, issued December 28, 1943, to which reference may be made if necessary. As will be clear from Figure 5, by virtue of the laterally swingable shaft-supporting castings 71, the kicker wheels 81 and associated parts are free to swing laterally inwardly and outwardly about the axes of their supporting shafts 67 and 68. Rod means, preferably in the form of a pair of interconnected eyebolts 83, each carrying a spring 84 and an adjusting nut 85, extend through openings formed respectively in the rearwardly turned ends of brackets that are fixed to the members 71. The springs 84 are under compression and therefore serve to yieldingly urge the beet engaging wheels 81 toward one another, the wheels however being capable of moving laterally outwardly, as shown in Figure 5, to accommodate the passage of large beets. As best shown in Figure 4, the beet engaging wheels are disposed upwardly and to the rear of the beet lifting plows 55, and as best disclosed in the above-mentioned Walz patent, the beet engaging wheels function to grasp the beets loosened by the plows 55 and forcibly project the beets upwardly and rearwardly. The kicker wheels 81 are fixed to the shafts 73 by set screws 87 which, when loosened, permit the kicker wheels to be raised and lowered on the shafts 73 so as to adjust their position relative to the plows 55 for the purpose of accommodating excessively large or excessively small beets, as may be necessary. At their inner ends the eyebolts 83 are connected to an anchoring stud 88.

A transfer elevator, indicated in its entirely by the reference numeral 90 is pivotally connected at its rear end with the rear portion of the frame 15 and at its forward end is disposed to receive beets from the lifting unit 50. Referring now more particularly to Figures 2 and 4, a pair of vertical angles 91, which forms a part of a main elevator supporting structure to which reference will be made below, is fixed to the vertical rear flange of the angle 18 and each angle 91 at its lower end below the angle 18 extends downwardly and forwardly, as best shown in Figure 4. A bracket 92 is fixed to each forwardly bent end of the two angles 91 and the brackets 92 are apertured to receive a pivot shaft 93. The elevator or conveyor 90 includes a pair of laterally spaced side walls 94 held in spaced relation by any suitable means, each side wall 94 having a plate 95 apertured to receive the pivot shaft 93, by which the rear end of the transfer conveyor is supported for generally vertical swinging movement. A forward bracket 96 is fixed to the forward end of each side wall 94 and the brackets 96 are apertured to receive an idle cross shaft 97. An endless conveyor element 98 is supported by suitable sprockets 100 and rollers 100' or other means on the two shafts 93 and 97, the element 98 preferably being in the form of a chain comprising transverse rods 99 (Figure 1), the same as or similar to a potato elevator chain. The sprockets on the shaft 93 serve to receive and drive the conveyor chain 98. In normal operating position, as shown in Figure 2, the forward end of the transfer elevator 90 is disposed closely adjacent the rear of the beet driving rods 56 and substantially underneath the kicker wheels 81.

To each of the side walls 94 an extension shield 102 is pivoted. Each extension shield comprises a sheet 103 secured in any suitable manner to an arm 104 which is pivoted, at 105, to the associated front bracket 96. Each arm 106 is provided with an extension 107 that is connected by a chain 108 to a fixed point on the frame 15, such as a bolt 109, the latter preferably carrying a hook member by which the effective length of the chain 108 may be adjusted by engaging the chain at different points therewith. A stop member 110 is provided for each shield 102 to limit its movement in a forward direction, each stop means 110 consisting of a rod 111 pivoted to the associated side wall 94 and extending upwardly through an eye 112 carried by the shield. The upper end of the rod 111 is provided with a stop collar 113 or similar part whereby the engagement therewith of the eye 112 on the shield limits the forward swinging of the latter to substantially the position shown in Figure 2 (dotted lines, Figure 4). Thus, in the lowered position of the transfer elevator 90, the front end thereof is supported by the chains 108, and the latter members serve to position the shields 102 generally rearwardly and above the kicker wheels 81 so as to guide beets and the like projected rearwardly by the kicker wheels 81 into the elevator 90.

The frame 51 of the beet lifting unit 50 is arranged for vertical movement in the frame 15. To this end, a U-shaped member 125 having an intermediate portion 126 (Figure 3) and end portions 127 and 128 is mounted for lateral adjustment on the vertical flange of the transverse cross bar 21 by any suitable means, such as bolt and slot means 130 (Figure 5). The rearwardly extending arm portions 127 and 128 of the member 125 carry rollers 132 (Figure 4) which are disposed on opposite sides of the associated lifting plow standards 54. A pair of generally vertically shiftable links 135, one at each side of the beet lifter frame unit 50, are connected at their forward ends to a cross bar 136 carried at the lower ends of the two front vertical frame bars 27. A roller 138 is disposed at the rear end of each of the links 135 and a pin 139 is carried by the rear end of each link 135 in front of the associated lifting plow standards 54. In the uppermost position of the vertically shiftable lifter frame 51 (full lines, Figure 4) the lower portions of the shanks 54 engage the rear ends of the links 135 and lift them into the position shown in Figure 4 in full lines. When the beet lifting unit is lowered into operating position (dotted lines) the links 135 remain in a generally horizontal position, as shown in Figure 4, being held in that position by a pair of stop rods 141 pivoted at their upper ends to lugs 142 carried by the intermediate portion 130 of the U-shaped member 126. An angle 143 (Figure 4) connects the links 135 and is apertured to receive the lower end of the rods 141. A pair of stop collars 144 are carried in spaced apart relation on the lower end of each rod 141. The rods 141 keep the links 135 from dropping downwardly too far and are effective to hold them in a position to transmit the forward draft to the plow standards 54.

A lifting chain 151 is connected at its upper end to the power lift arm 9 and at its lower end is connected to a clip 152 fixed to the transverse angle 57 forming a part of the beet lifter frame 51. Thus, whenever the power lift of the tractor is actuated to swing the power lift arm 9 up into the lifted position, as shown in Figure 4, the beet lifting unit is raised into a transport position, as shown in full lines in Figure 4. For adjusting the depth of operation of the lifting plows 55 when the unit 50 is lowered into operating position (dotted lines, Figure 4), we provide a hand lever 154 pivoted at 155 to an angle or bracket 156 fixed to the forward side of the angle 21. The hand lever 154 operates along a sector 159 and has fixed thereto an arm 161 to which a chain 162 (Figure 3) is fixed at its upper end. The lower end of the chain 162 is connected with the lifter frame 51 in any suitable manner. By this means, when the power lift arm 9 is lowered, the lifting chain 151 goes slack and the weight of the lifting unit 50 is supported through the chain 152 on the adjusting lever 154, whereby movement of the latter adjusts the operating depth of the lifting plows 55 and the positions of the kicker wheels 81.

When the lifting unit 50 is raised into an inoperative position it is desirable also to raise the transfer elevator 90, and to this end a cable 165 is connected at its upper end to the vertically shiftable lifting frame 51 and is trained over a pair of pulleys 166 and 167 and at its lower end is connected to the outer pivoted shield arm 104.

As best shown in Figure 2, when the parts are in the lowered position, the front end of the transfer elevator 90 is supported on the chains 108 and the lifting cable 165 is slack. The pull exerted by the chains 108 holds the shields 103 in the operating position shown in Figure 2. However, when the lifting unit 50 is raised by the upward movement of the power lift arm 9, after the raising movement has progressed to a certain extent the cable 165 becomes taut, which first swings the shields 102 upwardly and rearwardly, as shown in Figure 4, out of the way of the kicker wheels 81, then continued upward movement of the lifting frame 51 exerts a pull through the cable 165 and raises the front end of the transfer elevator into its transport position. It will be noted from Figure 4 that the front end of the elevator is not raised until after the lifting plows 55 and the kicker wheels 81 have been raised through a part of their movement. This is arranged in this way in order to permit the front portion of the transfer elevator 90 to move into a position underneath the beet guiding rods 56, and as just described the action of the cable 165 is to swing the shields 102 rearwardly and out of the way of the knicker wheels.

A windrowing elevator is pivotally and swingably connected with the rear end of the frame 15 in a position to receive beets from the transfer elevator 90 and is adjustable to different lateral positions for the purpose of placing the beets from any one of several rows into one windrow in order to facilitate picking up the beets at a later operation. The main elevator and its supporting and actuating structure will now be described.

The main elevator is indicated in its entirety by the reference numeral 170 and consists of sides 171 and 172 connected together in laterally spaced relation by any suitable means and having disposed therebetween the upwardly and rearwardly moving flight of an endless elevator element 173, preferably a chain of interconnected rods, similar to the elevator of a potato digger. The lower flight of the elevator chain 173 is supported by idle rollers 174. The elevator 170 also includes longitudinally extending frame bars 176, the front and lower ends of which are pivoted on a cross shaft, in turn, is rotatably supported on studs 177. Rollers supporting the front end of the conveyor chain 173 are mounted on this shaft. The studs 177 are carried in a laterally swingable yoke indicated in its entirety by the reference numeral 180 and comprising a relatively rigid structure including a generally rectangular framework that is made up of a pair of vertical bars 181, the lower ends 182 of which are bent horizontally forwardly to receive the pivot studs 177. Preferably, the vertical bars 181 are in the form of angle members connected together in laterally spaced relation by suitable cross braces, and each bar 181 is reenforced by truss rods 185. The upper cross brace just mentioned is indicated by the reference numeral 186 in Figure 1 and, with two forwardly converging bars 187 and 188, form an upper triangular member the forward or apical portion of which is connected by downwardly and rearwardly extending braces 189 (Figure 2) with the laterally spaced bars 181. A similar triangular structure 191 (Figure 2) is secured, as by welding or the like, to the spaced bars 181 a distance well below the upper ends thereof and a slight distance below the points where the braces 189 are connected therewith. The triangular structure 191 includes a pair of forwardly converging angles 192 the forward ends of which are fixed to the lower end of a vertical bar 194. The upper end of the latter bar is welded or otherwise secured to the forward portions of the upper converging bars 188. The forward ends of the upper converging bars 187 and 188 are welded to an apertured plate 195 and the forward ends of the lower converging angles are welded to a second apertured plate 196. These apertured plates pivotally receive a vertically disposed pivot shaft 198 which is supported rigidly in a vertical position by framework similar to that just described and which forms a part of the frame 15.

The pivot shaft supporting framework includes the upper portions of the angles 91 mentioned above and a pair of rearwardly converging angle members 201 which at their forward ends are welded to the angles 91 and at their rear converging ends carry an apertured plate 203 which receives the lower end of the pivot shaft 198. A pair of rearwardly converging bars 206 and 207 (Figure 1) are welded at their forward ends to the upper ends of the angles 91 and also to the upper ends of a pair of downwardly and rearwardly converging braces 208. The rear ends of the converging bars 206 and 207 are connected to a plate or the like that is apertured to receive the upper portion of the pivot shaft 198. The lower ends of the downwardly and rearwardly converging braces 208 are secured in any suitable manner, as by welding, to the rear converging ends of the angles 201. The upper ends of the angles 91 are connected by a pair of brace rods 210 with the forward portion of the framework 15.

The structure just described provides a rigid connection for the front end of the conveyor 170 and permits the latter to be swung laterally into different positions relative to the tractor, and also, the conveyor 180 may be swung upwardly or downwardly about a transverse axis defined by the pivot studs 177. A hood 215 is supported by a pair of arched bars 216 which at their front ends are connected with the rearwardly extending flanges of the angles 91. The hood 215 includes an extension 217 which may be secured to the main body of the hood 215 in different positions of vertical adjustment. The hood is open at its front end to receive beets coming over the transfer elevator 90. Beets fall from the hood 215 into the hopper 220, which forms a part of the conveyor 170. The hopper 220 is rigidly secured to the yoke 180, as by bolts 221 and 222, the latter being associated with a pair of upwardly extending clips 223 carried by the forwardly extending portions 182 of the yoke bars 181.

A cross bar 230 (Figure 1) is rigidly fixed to the upper end of the pivot shaft 198, forming oppositely directed arms 231 and 232. These arms pivotally carry pulleys 234 and 235, the pivots being shown at 236, Figure 1. The cross bar 231 may be reenforced by a truss bar 239, if necessary. A cable 237 is fixed, as at 238 (Figure 2), to the frame of the pulley 235 and is extended rearwardly and trained over a pulley 241 connected to the right side of a U-shaped brace 242 carried by the conveyor 170. The cable 237 is then extended forwardly and passes over the roller of the pulley 235 and then extends laterally inwardly where it is attached to a reel 245 that is mounted for rotary movement in a bracket 246' fixed to the upper end of the pivot shaft 198. The reel 245 is operated by a hand wheel 246. A second cable 247 is arranged in a similar manner, extending forwardly to the brace 242 where it passes around a pulley 248 and then rearwardly where it passes around the pulley 234 and is anchored to the lower portion of the reel 245. Turning the hand wheel 246 in one direction will tighten both cables 237 and 247, thus raising the conveyor 170, and turning the hand wheel 246 in the other direction will lower the elevator. A ratchet hand-operated latch 249 is carried by the bracket 246' and is effective to hold the hand wheel 246 against movement in a direction that would permit the elevator 170 to lower.

For swinging the elevator from one side to the other we provide a worm gear sector 251 (Figure 2) fixed in any suitable manner to the upper portion of the pivot shaft 198. Meshing with the sector 251 is a worm 252 formed on or secured to the forward end of a crank screw shaft 253, the forward end of which is formed with or carries a hand crank 254 disposed adjacent the operator's station on the tractor, represented by the tractor seat S. Turning the crank 254 in one direction or the other will act through the gearing just described to shift the rear end of the conveyor 170 from one side to the other, and being irreversible, said gearing will also serve to hold the pivot shaft 198 in any position of adjustment. However, the conveyor 170 is permitted to have a limited amount of lateral swinging, even though the pivot shaft 198 is held against movement. This is so because the rear end of the conveyor may swing to one side or the other, providing the elevator swings upwardly at the same time, the cable at the side toward which the elevator or conveyor swings going slack. Thus, even though the mechanism that swings the elevator from one side to the other is locked in adjusted position, the elevator or conveyor itself is permitted to have limited lateral swinging, thereby relieving the connecting framework of the relatively high stresses that would be involved if an attempt were made to restrain the conveyor from all lateral movement when latched in any given position.

A half-circle member in the form of a sector 258 (Figure 1) is fixed at its ends to the cross bar 230 and at its intermediate portion passes through a bracket 259 that is carried at the upper end of an inverted V-shaped member 261, the two sides 262 of which diverge downwardly and are connected, respectively, to the longitudinal frame bars 16 and 24, as best shown in Figure 1. Adjustable sector locking means including a clamping screw 263 having an operating handle 264 is carried by the bracket 259 and, when tightened, cooperates with the worm gearing mentioned above in holding the pivot shaft 198 against movement.

The mechanism for driving the various parts of the beet harvester as described above is best shown in Figures 1-3. Referring now to these figures, a driving sprocket 271 (Figure 4) is fixed to the rear end of the power take-off shaft 45 and drives a sprocket chain 272 (Figure 3) which extends laterally and upwardly toward the left of the tractor and at its upper end is trained over a sprocket 274 which is fixed to the forward end of a drive shaft 275. At an intermediate point on the shaft 275, a sprocket 277 is fixed and which drives a sprocket chain 278, as best shown in Figure 5. The chain 278 passes around a spring biased idler 279 and around the sprocket 79 which, as described above in connection with the kicker wheel mechanism, is fixed to the rear extended end of the kicker wheel drive shaft 67. Rearwardly of the sprocket 277 is a bevel gear 281 which meshes with and drives a companion bevel gear 282 fixed to the left end of a transverse shaft 283 journaled for rotation in suitable bearing brackets supported by the frame bar 24 and an auxiliary frame bar 284 (Figure 3). As best shown in Figure 4, a sprocket 285 is fixed to the right end of the cross shaft 283 and receives a driving chain 287 which passes over a pair of idler gears 288 journaled on the frame 15 and also over a rear sprocket 289 which is fixed to the upper shaft 93 of the transfer elevator 90. A shield 291 (Figure 4) covers the two gears 77 and 78 that drive the kicker wheels 81.

The rear end of the drive shaft 275 carries a sprocket 293 (Figure 1) over which a sprocket chain 294 is trained. The chain 294 extends to the right and upwardly and is trained around a sprocket 295 fixed to the rear end of a longitudinally extending shaft 296 that is journaled for rotation in the portion of the conveyor-supporting framework that is carried by the frame 15. A bevel gear 297 is fixed to the rear end of the shaft 296 and drives a second bevel gear 298 which is loose on the pivot shaft 198, and the loose bevel gear 298 in turn drives a third bevel gear 299 that is fixed to a shaft 301 which is journaled in the conveyor supporting yoke 180. A universal joint 302 is connected to the rear end of the shaft 301 and serves to drive a pair of telescopically associated drive shaft sections 303 and 304, the latter, as best shown in Figure 1, being connected by a universal joint 305 with a rearwardly extending shaft 306 that extends to the upper end of the conveyor 170 and is connected through suitable gearing to drive the upper end of the conveyor chain 173. The topping and pick-up unit of the harvester is carried forward of the tractor rear wheels 5 and is driven by a sprocket chain 310 which at its rear end is trained around a sprocket 311 that is fixed to the transverse shaft 283. The forward portion of the chain 310 is trained over a sprocket fixed to a cross shaft 312 supported by suitable brackets forward of the rear axle of the tractor and which, as best shown in Figure 2, drives a chain 313 that actuates the topping and pick-up unit. The latter is disclosed in detail in the copending application filed May 3, 1943, by Claude W. Walz, Clarence T. Rasmussen, and Howard F. Clausen, Serial No. 485,527 now Patent 2,433,799, to which reference may be made if necessary, and it will therefore suffice to point out that as shown in Figure 2A, the topping unit includes a vertically shiftable topping frame 314 connected to the lower ends of the rear vertical frame bars 27 by a draft frame 315, a pivoted topping knife 316 controlled by a finder unit 317 and a top pick-up unit 318. A chain 307 (Figure 3) trained over a sprocket on the shaft 312 is connected with the left end of a shaft 308 that forms a part of the unit 318 and serves to transmit power from the power take-off shaft 45 to drive the top pick-up 318. The front end of the topping frame carries a transverse laterally shiftable conveyor 309 which is driven from the chain 313 through a controlling reversing gear 319. The wheels of the finder unit 317 are driven by a chain 320 trained around a sprocket on the shaft 308.

Referring again to Figure 1, the direction of rotation of the shaft 306 is counterclockwise when standing at the rear and facing forwardly. The driving torque of the shaft 306 is compensated by the particular manner of connecting the cables 237 and 247. Since the shaft 306 rotates counterclockwise, the resistance of the load also tends to twist the conveyor 170 counterclockwise. However, it will be noted that the pulley 241 is connected with the yoke 242 an appreciable distance inwardly from the right side of the conveyor. In effect, therefore, the cables 237 and 247 considered together, are connected to the conveyor at a point to the left of the center thereof, whereby the unbalanced weight of the right-hand portion thereof serves to offset the tendency for the torque of the shaft 306 to raise the right side of the conveyor.

Figures 6, 7:
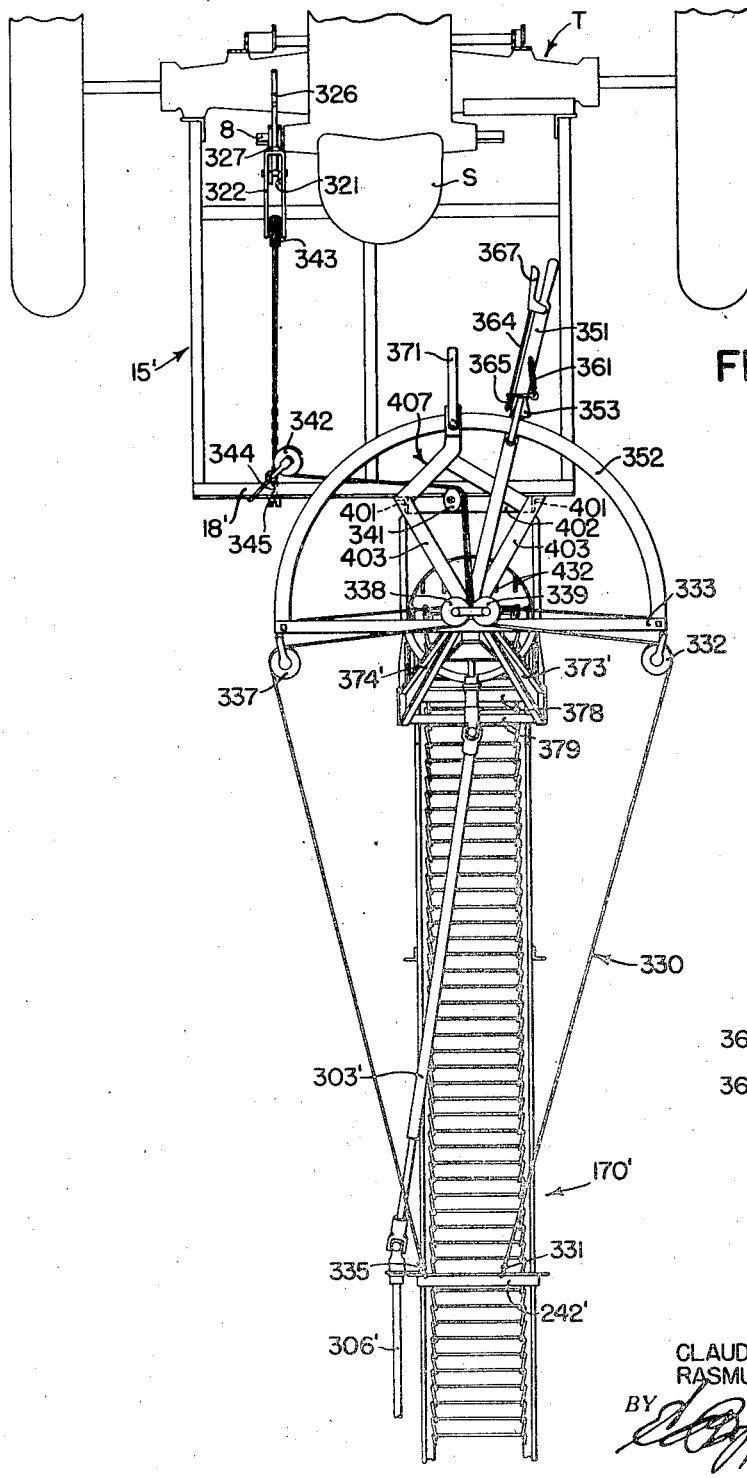

Figures 6, 7, 8 and 9 illustrate certain modified forms of the present invention. In the form of the invention shown in Figures 1-5, the rear end of the conveyor 170 is raised and lowered by hand, namely, by turning the hand wheel 246 (Figure 1). However, as shown in Figures 6 and 8, the conveyor supporting cables may be arranged to be operated by the power lift of the tractor whereby the rear portion of the conveyor may be raised and lowered by power derived from the tractor. It will be understood that it is usually desirable to raise the rear end of the conveyor when turning at the ends of the field in order to be sure that the rear end of the conveyor does not accidentally strike the ground or the fence or other objects. Referring now to Figures 6 and 8, the tractor T is provided with a lifting arm 321 that is fixed to the left end of the power lift shaft 8. A U-shaped yoke 322 is apertured at its rear ends to receive a pulley shaft 323 and adjacent its forward ends is slotted as at 324, to receive a pin 325 carried by the upper end of the power lift arm 321. The front end of the yoke 322 is apertured to receive a crank 326 which is threaded and is screwed into a nut member 327 welded or otherwise secured to the yoke 322. The rear or inner end of the crank 326 serves as an abutment receiving the upper end of the power lift arm 321, whereby when the latter is swung forwardly by operating the tractor power lift, the yoke 322 is moved in that direction.

Referring now to Figure 6, a single cable 330 is fixed at one end, as at 331, to the yoke 242' of the conveyor 170, preferably inwardly of the right side thereof for the reasons explained above, and the cable 330 is trained over a pulley 332 movably connected with the right end of a cross bar 333 that is fixed to the upper end of a pivot shaft 198' upon which the conveyor 170' is supported. The other end of the cable 330 is connected, as at 335 (Figure 6), to the left side of the yoke 242' and from this point the cable 330 extends forwardly and is trained over a pulley 337 movably carried by the left end of the cross bar 333. The latter member carries a pair of sheaves 338 and 339 disposed with their adjacent portions substantially in line with the axis of the pivot shaft 198', the two strands of the cable 330 coming together and passing between the sheaves 338 and 339. Forwardly, the two portions of the cable 330 pass over a double sheave 341 and then downwardly and to the left and over a second double sheave 342, finally being passed around a pulley 343 (Figure 8) mounted on the pulley shaft 323. The middle point, or forward ends of the two cable sections, are anchored to a chain 344 (Figure 8) which at its rear end is engaged in a hook 345 fixed to the rear end of the beet lifter frame 15'. When the tractor power lift is operated and the power lift arm 321 swings forwardly, due to the fact that the forward end of the cable 330 is anchored at a relatively fixed point, the rear end of the conveyor 170' is raised through substantially twice the distance through which the upper end of the arm 321 moves, yet by virtue of the fact that the two cable sections pass between the sheaves 338 and 339 (Figure 6) in line with the pivot axis of the shaft 198', the rear end of the conveyor 170' may be raised regardless of whether or not the conveyor extends directly rearwardly, as shown in Figure 6, or to one side or the other.

In this form of the invention means is provided whereby the rear end of the conveyor 170' may be shifted from one side to the other by means accessible to the operator on the seat S of the tractor. Referring now more particularly to Figures 6 and 7, a relatively long hand lever 351 is pivoted at its rear end to the shaft 198' and passes just underneath a sector in the form of a half circle or arch member 352 secured at its rear ends to the cross bar 333. A swinging cam 353 is pivoted, as at 354, to the hand lever 351 and preferably is disposed between the latter and a strap 355 which passes over the circle 352, as best shown in Figure 7, the strap 355 being held in place by a rear bolt 356 and the pivot member 354. Secured, as by welding or the like, to the front end of the cam member 353 is an arm 358 having an eye formed at each end thereof. The eye at the right end is indicated at 359 and is disposed in a horizontal plane. A spring 361 is connected at its rear end to the eye 359 and at its forward end is connected to the hand lever. The eye at the other end of the arm 358 is indicated by the reference numeral 363 and is disposed in a vertical plane. A rod member 364 at its rear end passes through the eye 363 and supports a compression spring 365. The compression spring 365 is confined between the eye 363 and a stop or abutment 366 carried at the rear end of the rod 364. The forward end of the rod is connected to a hand grip 367 pivoted to the front end of the hand lever 351.

The parts are so arranged, having particular reference to the springs 361 and 365, that the spring 361 normally holds the cam 353 in the position shown in Figure 7, that is, with the left hand cam face 353a wedged against the forward edge of the circle 352. With the parts in this position, swinging the hand lever 351 to the left will swing the rear end of the conveyor 170' to the right, but the hand lever 351 may be shifted to the right without swinging the conveyor since movement of the hand lever in this direction relative to the circle 352 is relatively free. However, if the operator compresses the hand grip 361, this action, in turn, compresses the spring 365 to an extent sufficient to overcome the spring 361, thereby swinging the right hand cam face 353b (Figure 7) against the edge of the circle 352, whereby outward or right hand movement of the lever 351 will swing the rear end of the conveyor 170' to the left while the hand lever 351 is capable of moving inwardly or to the left, relative to the circle 352, without shifting the conveyor. By compressing the hand grip 367 an intermediate amount, the cam 353 may be moved into a position in which the sections 353a and 353b both are disengaged from the forward edge of the circle 352, whereby the hand lever 351 may be moved freely into any position relative to the circle 352 without moving the conveyor. Thus, by proper manipulation, the hand lever 351 may by a series of back and forth movements be used to shift the rear end of the conveyor 170' into any desired position and the hand lever may be connected at any desired point with the circle 352 to effect this operation whereby the operator may dispose the handle 351 in the most convenient position.

The conveyor 170' may be locked in any position of lateral adjustment by adjustable locking mechanism including handle means 371 which is constructed slightly differently from the handle or clamping screw 264 shown in Figure 2 and described above. Also, the conveyor supporting yoke 180' shown in Figures 6 and 8 is slightly different from the conveyor supporting yoke 180 shown in Figures 2 et seq. The yoke 180' comprises two vertical sections 373 and 374 which are generally parallel and vertical at their lower portions (see Figure 9), the upper sections converging forwardly and upwardly, forming sections 373' and 374' (Figure 6), the upper ends being connected by a plate 376 (Figure 8) which is apertured to receive the pivot shaft 198'. Adjacent the bent portions of the members 373 and 374, cross bars 378 and 379 are provided, together with forwardly converging angles 391 to which is connected an apertured plate 392 (Figure 9) receiving the lower end of the pivot shaft 198'.

The yoke receiving structure of the frame 15' includes a pair of vertical angles 401 secured to the rear angle 18' (Figure 6) of the rear frame 15', an upper cross bar 402, a pair of downwardly, rearwardly and laterally inwardly extending braces 403 which at their lower rear ends are secured to a pair of horizontal rearwardly converging angles 404. Extending forwardly from the upper cross bar 402 (Figure 6) is a bracket 407 on the forward end of which the arc or circle 352 is disposed. The bracket 407 is provided with a small yoke 408 through which the circle member 352 extends. The forward end of the bracket 407 is provided with a screw-threaded aperture in which a set screw 409 (Figure 8) is disposed, the upper end of the set screw 409 serving to receive and support the underside of the circle member. The yoke 408 is also screw-threaded and receives the threaded shank portion 411 of the clamping member 371. By tightening the latter member, as by turning it in the proper direction, the circle member 352 is firmly clamped in position, and by adjusting the set screw 409 either upwardly or downwardly, the circle member will be clamped tightly with the handle 371 extending forwardly in a convenient position, the forward position of the handle member 371 when tightened being adjusted by adjusting the set screw 409.

Referring now to Figures 8 and 9, the modified form of the hopper and associated structure will now be described. A U-shaped angle 425 is secured as by welding or the like at its forward ends to the angles 404 and is reenforced by a cross brace 426 secured to the U-shaped angle 425 and the rear ends of the angles 404. A plurality of dependent U-shaped rod members 427 are swingably connected at their upper ends to the rear circular portion of the U-shaped angle member 425, these rod members forming a curtain or screen against which the beets, brought rearwardly by the transfer elevator 90', are directed. The lower ends of the swingable depending rod members 427 are embraced by a U-shaped part 429 secured, as at 431, at its ends to the lower portions of the yoke members 373 and 374. The forward part of the U-shaped member 429 is provided with downwardly and rearwardly extending rods 432 rigidly secured to the U-shaped member 429 and forming therewith a hopper from which the beets move onto the conveyor chain 439 (Figure 8) that forms a part of the conveyor 170'. The latter is of substantially the same construction as the conveyor 170 except that the sides 171' and 172' are pivoted on a pipe member 435 carried at the lower ends of the members 373 and 374. Forwardly extending brackets 436 are carried by the members 373 and 374 and the forward ends of the brackets carry cone rollers 437 upon which the forward part of the conveyor chain 439 (Figure 8) is supported.

It will be seen that the U-shaped hopper member 429 is open rearwardly. Therefore, beets that are delivered into the hopper by the transfer conveyor or elevator 90' can move freely out onto the upper run of the conveyor chain 439 since the rod members 427 that are out at the open space at the rear of the U-shaped member 429 can swing freely outwardly. On the other hand, all of the other rod members 429 that are not at or adjacent the open space are restrained against outward swinging, and therefore serve as a hood or curtain which prevents the beets from being thrown away from the machine, yet permits soil and clods to fall through or between the rods. Thus, when the beet conveyor 170' is extended substantially directly rearwardly, the intermediate rod members are capable of swinging outwardly to accommodate the flow of beets, the other rod members being restrained against outward swinging by virtue of their lower ends contacting the U-shaped member 429. On the other hand, when the conveyor is swung to one side or the other, the rod members at one side or the other are now opposite the open space and they can swing freely outwardly while the other rod members are restrained against outward swinging by the U-shaped member 429. Figure 9 shows this action with the conveyor swung to the right side at an angle of approximately forty-five degrees. Thus, the rod members 427 permit the beets to flow freely onto the conveyor chain while effectively preventing any beets from being thrown outwardly.

It will be recalled that one of the features of the present invention is the provision of a beet conveyor which may be swung into different lateral positions so that the beets from several rows may be deposited in the same windrow. In order to facilitate the subsequent operation of loading the beets from the windrow into a truck, it is desirable to provide a relatively smooth clean strip upon which to deposit the beets. In order to provide this clean strip, according to the principles of the present invention, we provide a scraper or drag which is adjustably supported so that when moving along a row of beets to lift them the drag or scraper may be lowered into the position shown in Figure 8 in order to clear trash and the like from the ground and form a smooth clean strip upon which to deposit the beets. As best shown in Figure 11, the drag 440 is in the form of an A-frame having rearwardly and outwardly diverging sides 441 and 442 connected together by cross pieces 443 and 444. The forward cross piece 444 is connected by a link 445 with a laterally rigid member 446, including two straps 447 and 448 (Figure 11) pivotally connected at their forward ends to a cross member 449 carried at the lower ends of the frame angles 35'.

As best shown in Figure 10, a hand lever 452 is pivoted to the left hand frame bar 17' of the frame 15 and at its lower end extends downwardly, as at 453. An arm 454 is secured, as by welding or the like, to the hand lever 452 and is connected by a link 455 with the front cross piece 443. An auxiliary frame bar 458 (Figure 12) is secured at one end to the rear frame member 18' and has a lower section connected to the left end of the cross bar 18' by a short vertical angle 459 and a diagonal brace 461. A pair of laterally rigid frame sections 463 and 464 are pivoted together, as at 465, the upper frame section 463 being pivoted to a pair of lugs 467 carried by the angle 458, and the lower frame section 464 is pivotally connected with the cross piece 444. An arm 468 (Figure 10) is fixed rigidly to the upper frame 463 and is connected by a link 469 with the arm 453 of the hand lever 452. Cooperating with the latter is detent and sector mechanism 471. When the lever 452 is swung forwardly from the position shown in Figure 8 to the position shown in Figure 10, the drag or A-frame 440 is raised substantially parallel to itself into a transport position out of engagement with the ground. Ordinarily, where the beets and tops are windrowed respectively from eight rows into one windrow, the A-frame 440 is lowered into operating position only once during the harvesting of the beets from eight rows. Wear plates 472 preferably are provided along the lower edges of the sides 441 and 442.

A modified form of transfer elevator is shown in Figures 8 and 9. Referring now to these figures, the transfer elevator 90' includes a potato chain type of conveyor 98' supported by sprockets and rollers carried by side members 481, the upper ends of the latter being pivoted to receive a cross shaft 93' which serves to drive the chain 98'. Solid sides are not employed in this form of the invention as in the transfer elevator 90 described above. Instead, the sides of the elevator 90' are formed by a plurality of rods 482, each having a bent end inserted in the corresponding opening in the lower end of the associated angle 401. The forward end of each of the rods 482 is slidably carried in an angle 483 fixed to the side piece 481. A lifting cable 484 is connected, as at 485, to the right hand bracket 483 and, as best indicated in Figure 8, extends upwardly through one or more pulleys 486 and is connected at its forward end to the kicker wheel frame, in substantially the same manner as the cable 165 is connected thereto in Figure 4. The rods 482 are spaced apart so as to permit soil and the like to drop or fall off of the beets but are close enough together to prevent loss of beets. Suitable stop means may be provided, acting between the angles 481 and the supports 401, for limiting the lowered position of the elevator 90' so that the cables 484 may be slack whereby when lifting, the kicker wheels will be raised before the elevator 90'.

Figure 13 shows a modified form of adjustable lifting connection for the laterally swingable beet conveyor. Referring now to Figure 13, a U-shaped lifting arm 501 is fixed to the left end of the power lift rockshaft 8 and at its upper end is slotted, as at 502. Between the two sides of the arm 501, a rotatable adjusting screw 504 is disposed, being mounted for rotation in the arm 501 but held against axial movement. The crank member 502 is screw-threaded and receives a traveling nut 505 having trunnions 506 slidable in the slots 502. The traveling member 505 carries a swivel to which a pulley 508 is connected. The pulley or sheave 508 receives the beet conveyor cable 330' which at its lower end is connected by a chain 344' to a point of anchorage on the frame. From the pulley 508, the cable 330' extends directly to the sheave 341', which is located in substantially the same position as the sheave 341 shown in Figure 6. By turning the crank 503 the sheave 505 may be raised and lowered which has the effect of raising and lowering the outer end of the beet conveyor. Operation of the tractor power lift serves to rock the arm 501, which raises and lowers the beet elevator between its operating and transport positions.

Figures 14 and 15 show a form of beet cleaning means which has been illustrated as incorporated in the beet conveyor 170', but it is to be understood that this beet cleaning mechanism may also be incorporated in the beet conveyor 170 shown in Figures 1 et seq. Referring now more particularly to Figures 14 and 15, the beet cleaning mechanism, indicated in its entirety by the reference numeral 530, comprises a plurality of bars 531, which may be formed of wood, overlying the endless conveyor element 439. The forward end of each of the bars 531 carries a pair of apertured brackets 532, the several brackets being pivoted to a rod 533 supported by a pair of brackets 534 fixed to the sides 171' and 172' of the conveyor 170'. A vertical yoke 537 is fixed to the conveyor and, as best shown in Figure 14, carries three upstanding apertured brackets 538 through which the upper ends of three rods 539 extend. The lower ends of the rods 539 are pivoted to brackets 541 fastened to the forward portions of the cleaner bars 531. A spring 542 is disposed on each rod, being confined between the bracket 538 at one end and a set screw collar 543 at the other end. Other set screw collars 545 are fixed to the upper ends of the rods 539 to prevent them from becoming detached from the brackets 538. The springs 548 yieldingly hold the cleaner bars 531 down against the beets moved rearwardly by the conveyor element 439, and the angle between the bars and the conveyor element is relatively small whereby the bars are effective to roll the beets over and against one another so as to knock off any soil adhering to the beets.

Referring again to Figures 8 and 9, and Figure 14, it will be seen, particularly from Figure 9, that the pipe or pivot member 435 forms a part of the conveyor 170'. Preferably, the lower end of each of the yoke sections 373 and 374 is formed with or carries an extension 551 which is provided with an open U-shaped slot 552. The slots 552 receive the pivot pipe 435, and in order to provide means for quickly attaching and detaching the elevator 170', a short link 553 is apertured at the larger end to receive the pipe 435 and at its smaller end each link 553 is provided with a slot 554 (Figure 8) to receive a bolt 555 that extends through an opening 556 (Figure 14) formed in the rear portion of the member 436. The function of the bolt 555 is to act through the associated link 553 to hold that end of the pipe 435 in the U-shaped slot 552, thus holding the elevator 170' in position. If it should be desired to detach the elevator, all that it is necessary to do is to loosen the bolts 555, then by swinging the links 553 upwardly, they are detached from the bolts 555, thus permitting the elevator 170' to be lifted rearwardly out of the slots 552.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A beet harvester comprising a mobile frame, beet lifting plows carried thereby, a pair of kicker wheels carried for rotation by said frame and disposed to receive beets from said plows and forcibly project them rearwardly, and a rearwardly and upwardly extending conveyor supported from said mobile frame and disposed rearwardly of said kicker wheels, said conveyor having a beet receiving flight movable rearwardly in substantially the same direction as the direction in which said kicker wheels project the beets, the forward end of said conveyor being disposed underneath the rear portions of said kicker wheels.

2. In a beet harvester, the combination of topping means operable for removing the tops before the beets are lifted, plow means for lifting said beets from the ground, a pair of rotatable kicker wheels rotatable about generally vertical axes and disposed in a position to receive beets from said plow means and project them forcibly rearwardly, and rearwardly moving conveyor means receiving beets from said kicker wheels and conveying them substantially directly rearwardly.

3. In a tractor mounted beet harvester, an auxiliary frame including a downwardly extending portion and a generally rearwardly extending portion, means for securing the downwardly extending portion to the rear axle of the tractor, beet lifting means carried by the forward portion of said frame and connected in draft transmitting relation with the lower part of said forward downwardly extending frame portion, a swinging elevator carried by the rear portion of said frame and swingable from a position extending generally directly rearwardly laterally relative to said frame into different positions to windrow the beets, and means for conveying beets from the lifting means to said elevator.

4. In a tractor mounted beet harvester, an auxiliary frame including a downwardly extending portion and a generally rearwardly extending portion, means for securing the downwardly extending portion to the rear axle of the tractor, beet lifting means carried by the forward portion of said frame, a swinging elevator carried by the rear portion of said frame and swingable laterally relative thereto into different positions to windrow the beets, means for conveying beets from the lifting means to said elevator, said tractor having a power lift, and means actuated by the tractor power lift for raising said elevator.

5. In a tractor mounted beet harvester, a rear frame comprising laterally spaced sections adapted to be secured at their forward ends to the tractor at opposite sides of the operator's station thereon, a generally vertically extending framework connecting the rear ends of said frame sections, a vertically disposed pivot shaft carried by said framework, a swingable framework disposed generally vertically and connected to the upper and lower portions of said vertically disposed pivot shaft, and a laterally swingable beet elevator supported from the lower portion of said swingable framework.

6. In a tractor mounted beet harvester, a rear frame comprising laterally spaced sections adapted to be secured at their forward ends to the tractor at opposite sides of the operator's station thereon, a framework connecting the rear ends of said frame sections, a laterally swingable beet elevator supported by said framework, an arcuate sector connected with said elevator, a hand lever pivotally connected with the elevator and swingable along said sector, said hand lever extending to a point accessible from the operator's station on the tractor, and controllable connections between the hand lever and said sector whereby the elevator may be swung in one direction or the other by oscillation of said hand lever.

7. In a tractor mounted beet harvester, a rear frame comprising laterally spaced sections adapted to be secured at their forward ends to the tractor at opposite sides of the operator's station thereon, a framework connecting the rear ends of said frame sections, a vertically disposed pivot shaft carried by said framework, a laterally swingable beet elevator supported by said pivot shaft, a cross bar on the upper end of said shaft above said elevator, generally downwardly and rearwardly extending connections between the outer ends of said cross bar and the outer end of the elevator, and generally forwardly extending means disposed above the forward end of the elevator and accessible from the operator's station for turning said cross bar so as to swing said elevator.

8. In a tractor mounted beet harvester, a rear frame comprising laterally spaced sections adapted to be secured at their forward ends to the tractor at opposite sides of the operator's station thereon, a framework connecting the rear ends of said frame sections, a vertically disposed pivot shaft carried by said framework, a laterally swingable beet elevator supported by said pivot shaft, a gear mounted for free rotation on said shaft, driving means carried by said frame for driving said gear, and means driven from said gear for actuating said elevator in any lateral position of the latter.

9. In a beet harvester, means serving as a frame, an elevator, means for connecting the elevator with said frame for both generally vertical swinging movement and lateral swinging movement, and means for swinging said elevator laterally comprising a generally vertical shaft having oppositely arranged outwardly extending arms adjacent the upper end of said shaft and cable means extending from the outer end of each arm downwardly and outwardly to the elevator in laterally spaced relation, limited lateral swinging of the elevator being accommodated by slackening of the cable means at the side toward which said elevator tends to move and by upward swinging of the elevator.

10. In an agricultural implement, an elevator, supporting means therefor at one end of said elevator, driving means therefor including a drive shaft extending along the elevator to the other end thereof, and suspension means supporting the other end of said elevator, said last mentioned supporting means being connected with said elevator at one side of the center thereof so as to counterbalance the torque of said drive shaft.

11. In a beet harvester, means serving as a frame, a vertical shaft journaled for rocking movement therein about a vertical axis, a laterally swingable elevator connected to swing about the axis of said shaft and having a receiving end disposed below said shaft, means connecting said elevator with said shaft whereby rocking movement of the latter swings said elevator, a sector fixed to said shaft adjacent the upper end thereof and disposed above said elevator, an adjustable locking means cooperating with said sector for locking said shaft against movement.

12. In a tractor mounted beet harvester, a rear frame adapted to be connected at its forward end with the tractor, a vertically disposed pivot shaft carried by the rear portion of said frame generally in an upper position with respect thereto, an elevator supporting yoke pivoted at its upper end to said pivot shaft and including an elevator receiving section disposed generally below said pivot shaft, an elevator pivoted to said yoke sections and extending generally rearwardly, said elevator and said yoke swinging about said shaft as an axis, hopper means carried by the rear end of said frame generally underneath said pivot shaft and above the lower end of said elevator, beet lifting means carried by the forward portion of said frame, and means for delivering the lifted beets from said lifting means into said hopper in any position of the elevator laterally about the axis of said pivot shaft.

13. In a tractor mounted beet harvester, a rear frame adapted to be connected at its forward end with the tractor, a vertically disposed pivot shaft carried by the rear portion of said frame generally in an upper position with respect thereto, an elevator supporting yoke pivoted at its upper end to said pivot shaft and including an elevator receiving section disposed generally below said pivot shaft, an elevator pivoted to said yoke sections and extending generally rearwardly, said elevator and said yoke swinging about said shaft as an axis, hopper means carried by the rear end of said frame generally underneath said pivot shaft and above the lower end of said elevator, beet lifting means carried by the forward portion of said frame, means supporting said lifting means for generally vertical movement relative to said frame, and conveyor means supported at its rear end on said frame adjacent said hopper and being connected at its forward end with said raising and lowering means.

14. In a beet harvester, frame means, beet engaging and lifting means movably carried by said frame means, a conveyor carried by said frame means and arranged with its receiving end adjacent said beet engaging and lifting means to receive beets therefrom, and means disposed above both the rear portion of said beet engaging and lifting means and the forward portion of said conveyor for transferring beets from said beet engaging and lifting means to said conveyor.

15. In a beet harvester, means serving as a frame, a generally vertically shiftable support movable relative to said frame means, beet lifting plow means and beet engaging and delivering means carried by said shiftable support, a beet conveyor supported at one end on said frame and having its other end disposed underneath the rear part of said beet engaging and delivering means so as to receive beets therefrom, means for raising and lowering said shiftable support, and means connecting the other end of said beet conveyor with said shiftable support.

16. In a beet harvester, a generally vertically shiftable support, beet engaging plow means carried thereby, a pair of rotatable generally downwardly and rearwardly extending shafts, means for supporting said shafts for rotation on said support and for generally lateral swinging, rotatable beet engaging means fixed to the lower end of each of said shafts and disposed rearwardly of said plow means, spring means for urging said beet engaging means toward each other, and means for raising and lowering said support so as to raise and lower both said plow means and said beet engaging means.

17. In a beet harvester, a supporting frame, a generally vertically shiftable support movably carried by said supporting frame, beet lifting plow means carried by said vertically shiftable support, a pair of rotatable generally downwardly and rearwardly extending shafts, means for supporting said shafts for rotation on said support and for generally lateral swinging, rotatable beet engaging means fixed to the lower end of each of said shafts and disposed rearwardly of said plow means, spring means for urging said beet engaging means toward each other, a hopper carried on said supporting frame, means for raising and lowering said vertically shiftable support so as to raise and lower both said plow means and said beet engaging means, and a conveyor supported at one end on said vertically shiftable support so as to receive beets therefrom in any position of the beet lifting plow means and beet engaging means and supported at its other end on said supporting frame so as to deliver said beets to said hopper.

18. A beet lifting device for beet harvesters, comprising a pair of generally longitudinally extending laterally spaced apart driving shafts, shaft-supporting journals swingably mounted on said driving shafts, a driven shaft carried by each of said journals in depending relation, beet lifting means carried by the lower ends of said driven shafts and shiftable toward and away from each other by lateral swinging of said journals on said driving shafts, means for driving the driven shafts from the driving shafts, and spring means connected with said journals for yieldably resisting separating movement of said lifting means.

19. In a beet harvester, a pair of generally vertically movable lifting plows, rotatable beet engaging means disposed above and rearwardly of said plows and movable generally vertically therewith, a pivoted elevator adapted to receive beets from said rotatable beet engaging means and disposed at its forward end underneath said rotatable beet engaging means and rearwardly of said lifting plows, means for raising the latter and said rotatable beet engaging means, and means interconnected therewith for raising the forward end of said elevator after said lifting plows and rotatable beet engaging means have been partially raised.

20. A transfer conveyor comprising a pair of laterally spaced generally vertical bars, side members pivoted thereto, a conveying element supported by said members and extending therebetween, a bracket carried by each of said members, and sides for the conveyor, each comprising a plurality of rods pivoted to the associated bars and slidably supported on the associated bracket.

21. In a beet harvester, generally vertically shiftable beet lifting and engaging means, a downwardly and forwardly extending elevator pivoted at its rear end and disposed at its forward end adjacent said beet lifting and engaging means, shield means movably connected with the front portion of said elevator for guiding the beets to the latter, means for raising and lowering said beet lifting and engaging means, and means interconnected therewith for raising and lowering the front end of said elevator, said last mentioned connecting means being connected with said movable shield means for moving the latter out of the way of said beet lifting and engaging means before raising the front end of said elevator.

22. The invention set forth in claim 21, further characterized by stop means limiting the downward movement of the front portion of said elevator means, said stop means being connected with said shield means for moving the latter into operative position when the elevator is lowered.

23. In a beet harvester, supporting means, an elevator pivoted to said support means at one end and extending generally downwardly therefrom, means adjacent the other end of said elevator for delivering beets thereto, shield means pivoted to said other end of the elevator for guiding beets thereto, and means for raising said other end of the elevator, said raising means being connected with said pivoted shield means so as to first swing the latter into an upper position before raising the elevator.

24. In a tractor mounted beet harvester adapted to be mounted on a tractor having a generally longitudinally rearwardly extending power take-off shaft, a rear frame adapted to be secured to the rear end of said tractor, a generally longitudinally extending shaft journaled for rotation on said frame, means for driving said shaft from said power take-off shaft, rotatable beet engaging means carried by said frame for generally vertical movement, flexible means driving said beet engaging means from said longitudinal shaft and accommodating vertical movement of said beet engaging means relative to said frame, and elevating means adapted to receive beets from said beet engaging means and also driven from said longitudinal shaft.

25. In a tractor mounted beet harvester adapted to be mounted on a tractor having a power take-off shaft, a rear frame adapted to be secured to the rear end of the tractor, a generally longitudinally extending drive shaft journaled for rotation on said frame, means driving said longitudinal shaft from said tractor power take-off shaft, a beet lifting unit including beet engaging means adapted to be driven for moving the beets generally rearwardly, means mounting said lifting unit on said frame, means driving said beet engaging means from said drive shaft, an elevator connected with the rear end of said frame, means for driving said elevator from said driven shaft, and a transfer elevator supported by said frame and disposed between said elevator and said beet engaging means, and means for driving said transfer elevator from said longitudinal shaft.

26. The invention as set forth in claim 25, further characterized by topping mechanism driving means driven from the means that drives the transfer elevator from said longitudinal shaft.

27. The invention as set forth in claim 25, further characterized by the driving means between the longitudinally extending drive shaft and said transfer elevator comprising a transverse shaft, bevel gear means connecting said transverse shaft with said longitudinal shaft, shaft supporting means carried on the tractor, a transverse shaft supported thereby, and a sprocket and chain connection between said transverse shafts.

28. In a beet harvester, means serving as a supporting frame, a lifting unit comprising a pair of lifting plows, a generally vertically shiftable frame connected with said supporting frame means, and a pair of kicker wheels also carried by said lifting unit frame, and generally vertically shiftable link means connecting the lower portion of said lifting unit with said supporting frame.

29. A tractor mounted beet harvester adapted to be mounted on a tractor having a power lift, comprising a supporting frame adapted to be secured to the tractor, a generally vertically shiftable beet lifting unit carried by said supporting frame means, elevator means adapted to receive beets from said lifting unit, said elevating means including a section swingable vertically and pivotally mounted on said supporting frame means, and means connected between both said elevator section and said lifting unit and operatively connected with said tractor power lift whereby operation of the latter serves to raise both said beet lifting unit and said swingable elevator section.

30. In a beet harvester, supporting frame means, a laterally and vertically swinging elevator connected therewith, a part rockable about a generally vertical axis and having generally laterally extending arms, flexible element means extending between the outer end of each arm and said elevator for holding the same in position, means for rocking said part about its axis and acting through said flexible element means for swinging said elevator laterally, said supporting frame means being adapted to be secured to a tractor having a power lift, and means connecting said tractor power lift with said flexible element means for raising said elevator by power derived from the tractor.

31. In a beet harvester adapted to be attached to a tractor having a power lift, a supporting frame means, a generally vertically shiftable beet lifting unit for lifting beets from the ground, a transfer elevator swingably connected with said supporting frame means and disposed in a position to receive beets from said lifting unit, a second elevator swingably connected with said supporting frame means and disposed in a position to receive beets from said transfer elevator, and connections between said lifting unit, said transfer elevator, and said last mentioned elevator and the tractor power lift whereby operation of the latter serves to raise said beet lifting unit and both of said elevators.

32. A beet harvester comprising frame means, beet engaging and lifting means carried thereby, a conveyor pivotally supported on said frame means for lateral swinging, hopper means carried by said frame means to receive beets from said beet engaging and lifting means, said hopper means including a generally horizontally disposed arcuate yoke fixed to said frame means and individually movable depending elements suspended from said yoke, and means carried by and movable with said conveyor for limiting the outward swinging of said elements except those substantially directly in front of said conveyor.

33. In a beet harvester or the like adapted to be attached to a tractor, a rear frame structure comprising generally longitudinally extending frame bars, means connecting the forward ends of said bars rigidly to the rear axle of the tractor, the latter having a power take-off shaft, drive shaft means supported by said frame structure generally adjacent one side thereof and extending in a generally longitudinal direction, a beet lifting unit movably carried by said frame but generally adjacent the other side thereof, a generally rearwardly extending elevator connected at its front end with said frame generally adjacent said other side and having a receiving end disposed in a position to receive beets and the like from said lifting unit, and means for driving said elevator from the rear end of said generally longitudinally extending drive shaft means.

34. A beet harvester comprising a mobile frame, beet lifting plows carried thereby, a pair of kicker wheels carried for rotation by said frame and disposed to receive beets from said plows and forcibly project them rearwardly, and a rearwardly and upwardly extending conveyor supported from said mobile frame and disposed rearwardly of said kicker wheels, said conveyor having a beet receiving flight movable rearwardly in substantially the same direction as the direction in which said kicker wheels project the beets.

35. In a beet harvester adapted to be mounted on a tractor having a power lift, beet lifting means, means for carrying the beet lifting means on the tractor, a laterally swingable elevator, means for supporting the elevator on the rear part of the tractor, said elevator being swingable laterally relative thereto into different positions for windrowing the beets, means carried at least in part by the tractor for conveying beets from the lifting means to said elevator, means for raising both said elevator and said beet lifting means, and means connecting said raising means with the power lift of the tractor to be actuated thereby.

36. In a tractor mounted beet harvester, a rear frame adapted to be connected at its forward end with the tractor, a vertically disposed pivot shaft carried by the rear portion of said frame generally in an upper position with respect thereto, an elevator supporting yoke connected at its upper end to said pivot shaft and including an elevator receiving section disposed generally below said pivot shaft, an elevator connected to said elevator receiving section of said yoke and extending generally rearwardly, said elevator and yoke swinging about the axis of said shaft, hopper means disposed generally underneath said pivot shaft and adapted to deliver beets into said elevator, and beet lifting means carried by said frame, said hopper receiving beets from said beet lifting means.

37. In a tractor mounted beet harvester, a rear frame adapted to be connected with the tractor, an elevator supporting yoke pivoted at its upper end to the rear portion of said frame and including an elevator receiving section disposed generally below the axis of pivoting of said yoke, an elevator connected to said downwardly extending elevator receiving section, said elevator and yoke swinging about said pivot axis relative to the tractor, hopper means carried by the rear portion of said frame generally in line with said pivot axis and above the lower end of said elevator, and beet lifting and conveying means carried by said frame for delivering beets into said hopper in any position of the elevator laterally about said axis.

38. In a beet harvester, a generally vertically shiftable support, beet engaging plow means carried thereby, a pair of rotatable generally downwardly and rearwardly extending shafts, means for supporting said shafts for rotation on said support and for generally lateral swinging, rotatable beet engaging means fixed to the lower end of each of said shafts and disposed rearwardly of said plow means, and spring means for urging said beet engaging means toward each other.

39. In a beet harvester, a generally vertically shiftable support, beet engaging plow means carried thereby, a pair of rotatable generally downwardly and rearwardly extending shafts, means for supporting said shafts for rotation on said support and for generally lateral swinging, rotatable beet engaging means fixed to the lower end of each of said shafts and disposed rearwardly of said plow means, and means for raising and lowering said support so as to raise and lower both said plow means and said beet engaging means.

40. In a beet harvester, a pair of generally vertically movable lifting plows, beet engaging means disposed above and rearwardly of said plows and movable generally vertically therewith, a pivoted elevator adapted to receive beets from said beet engaging means and disposed at its forward end adjacent said beet engaging means and rearwardly of said lifting plows, means for raising the latter and said beet engaging means, and means interconnected therewith for raising the forward end of said elevator after said lifting plows and beet engaging means have been raised at least partially.

41. In a tractor mounted beet harvester adapted to be mounted on a tractor having a power take-off shaft, a rear frame adapted to be secured to said tractor, a drive shaft journaled for rotation on said frame, means for driving said shaft from said power take-off shaft, driven beet engaging means carried by said frame for generally vertical movement, flexible means driving said beet engaging means from said drive shaft and accommodating vertical movement of said beet engaging means relative to said frame, and elevating means adapted to receive beets from said beet engaging means and also driven from said drive shaft.

42. In a beet harvester, means serving as a supporting frame, a lifting unit comprising a generally vertically shiftable frame connected with said supporting frame means, a pair of lifting plows carried by said vertically shiftable frame, said lifting plows including vertically extending standards connected at their upper ends with said shiftable frame, and a pair of generally vertically shiftable link means connecting the lower portions of said lifting plow standards with said supporting frame.

43. The invention set forth in claim 33, further characterized by a ground clearing member disposed at the side of said frame carrying said drive shaft and alongside said beet lifting unit and said elevator, and means for raising and lowering said clearing member.

44. A beet harvester comprising frame means, beet engaging and lifting means carried thereby, a conveyor pivotally supported on said frame means for lateral swinging about a generally vertical axis and in a position thereon to receive beets from said engaging and lifting means, an arcuate member carried by said conveyor and fixed to the latter so as to form at the front end of the conveyor a generally semi-circular section with an open space at the other side leading to the conveyor, means serving as an arcuate member fixed to said frame above said first-mentioned arcuate member and adjacent the rear portion of said beet engaging and lifting means, a plurality of individually movable depending elements suspended from said second arcuate member and having their lower ends lying within said first mentioned arcuate member, those depending elements whose lower ends are disposed adjacent said space being free to swing rearwardly toward said conveyor, the other elements being limited in their swinging movement by the generally semi-circular section of said first mentioned arcuate member, and the centers of said arcuate members lying substantially in said axis of lateral swinging movement of said conveyor.

45. A beet handling device for beet harvesters and the like, comprising a pair of generally longitudinally extending laterally spaced apart driving shafts, shaft-supporting journals, each having a horizontal section receiving one of said pair of longitudinally extending shafts and a generally downwardly extending shaft-receiving section, a driven shaft carried by each of said generally downwardly extending shaft-receiving sections of said swingable journals, a pair of bevel gears connecting each of said longitudinally extending driving shafts with the associated generally downwardly extending driven shaft, and beet engaging means carried by the lower end of each of said driven shafts, said beet engaging means being generally swingable toward and away from each other by virtue of the lateral swinging of said shaft-supporting journals.

46. A beet handling device for beet harvesters and the like, comprising a pair of generally longitudinally extending laterally spaced apart driving shafts, intermeshing gears, one on each shaft, for causing said longitudinal shafts to be driven together, shaft-supporting journals swingably mounted on said longitudinal driving shafts, a driven shaft carried by each of said journals in depending relation, beet engaging means carried by the lower ends of said driven shafts and shiftable toward and away from each other by lateral swinging of said journals on said driving shafts, and means for driving the driven shafts from the driving shafts.

47. A beet lifting device for beet harvesters and the like, comprising a frame, said frame including a generally transverse upper section and a generally transverse lower section, a pair of beet lifting members, each including a generally upwardly extending shank, means adjustably fixing said shanks to the ends of said upper and lower transverse frame sections, a pair of longitudinally extending driving shafts carried by the upper portion of said frame in generally laterally spaced relation, and a pair of beet handling parts supported for laterally swinging movement on said pair of laterally spaced shafts and geared thereto.

48. In an agricultural machine, material conveying mechanism comprising a pair of conveyors, one adapted to receive material and to deliver the same to the other conveyor, means providing for movement of said other conveyor relative to said one conveyor about a generally vertical axis adjacent the rear end of said one conveyor and disposed with its receiving end below the discharge end of said one conveyor, material guiding means supported adjacent the rear end portion of said one conveyor and comprising a support and laterally outwardly shiftable elements carried thereby, and means carried by the receiving end of said other conveyor and shiftable about said axis therewith for locking substantially all of said elements against outward movement except those substantially directly in line with said other conveyor so as to accommodate movement of said material to said other conveyor but preventing spilling of the material or the like at the sides thereof.

49. In an agricultural machine or the like, frame means, a hopper carried thereby and including a generally horizontally disposed yoke and a plurality of individually movable elements pivoted to said yoke, a conveyor, means pivotally connecting said conveyor with said frame means and accommodating movement of the conveyor about a generally vertical axis and having a receiving end substantially under said yoke, and means movable with said conveyor and engaging said elements for limiting their outward movement except those substantially directly in line with said conveyor.

50. A beet lifting device for beet harvesters, comprising a pair of generally longitudinally extending laterally spaced apart driving shafts, shaft-supporting journals swingably mounted on said driving shafts, a driven shaft carried by each of said journals, beet engaging means carried by said driven shafts and shiftable toward and away from each other by lateral swinging of said journals on said driving shafts, means for driving the driven shafts from the driving shafts, and spring means connected with said journals for yieldably resisting separating movement of said beet engaging means.

CLAUDE W. WALZ.
CLARENCE T. RASMUSSEN.
ROBERT D. GRIFF.

REFERENCES CITED

The following references are of record in the file of this patent:

UNITED STATES PATENTS

| Number | Name | Date |
|---|---|---|
| 328,252 | Reeves et al. | Oct. 13, 1885 |
| 442,751 | Stephan | Dec. 16, 1890 |
| 476,616 | Dodge | June 7, 1892 |
| 485,099 | Fulton | Oct. 25, 1892 |
| 645,559 | Feldman | Mar. 20, 1900 |
| 919,342 | Gettelmann | Apr. 27, 1909 |
| 1,044,547 | Liggett | Nov. 17, 1912 |
| 1,127,537 | Starkey | Feb. 9, 1915 |
| 1,140,202 | Smith | May 18, 1915 |
| 1,446,124 | Lichtenberg | Feb. 20, 1923 |
| 1,462,908 | Greening | July 24, 1923 |
| 1,573,998 | Ribbans | Feb. 23, 1926 |
| 1,668,157 | Kopitke | May 1, 1928 |
| 1,714,889 | Raoult | May 28, 1929 |
| 1,759,085 | Bebinger | May 20, 1930 |
| 1,761,286 | Zuckerman | June 3, 1930 |
| 1,785,249 | Dailey | Dec. 16, 1930 |
| 1,837,580 | Paris et al. | Dec. 22, 1931 |
| 1,869,641 | Wilson | Aug. 2, 1932 |
| 1,985,535 | DeWahl | Dec. 25, 1934 |
| 2,072,186 | Sishc | Mar. 2, 1937 |
| 2,077,941 | Leonard | Apr. 20, 1937 |
| 2,174,310 | Tuft | Sept. 26, 1939 |
| 2,308,392 | Roepke | Jan. 12, 1943 |
| 2,337,699 | Walz | Dec. 28, 1943 |

FOREIGN PATENTS

| Number | Country | Date |
|---|---|---|
| 426,318 | Great Britain | 1935 |